United States Patent Office 3,591,538
Patented July 6, 1971

3,591,538
OLEFIN POLYMERS HAVING IMPROVED GLOSS
Vernon J. Smith, Lake Jackson, Tex., assignor to The Dow Chemical Company, Midland, Mich.
No Drawing. Continuation-in-part of application Ser. No. 754,959, Aug. 23, 1968. This application May 16, 1969, Ser. No. 825,404
Int. Cl. C08f *19/14, 21/04*
U.S. Cl. 260—23          12 Claims

ABSTRACT OF THE DISCLOSURE

Olefin polymers having improved gloss and decreased haze are prepared by incorporating therein from about 20 to about 500 p.p.m. of a metal salt of a fatty acid and from about 10 to about 2000 p.p.m. of a metal salt of a carboxylic acid containing an aromatic group.

CROSS REFERENCES TO RELATED APPLICATIONS

This is a continuation-in-part of Ser. No. 754,959 filed Aug. 23, 1968.

BACKGROUND OF THE INVENTION

This invention relates to olefin polymers having improved optical properties and a method for the preparation thereof.

Films and other articles fabricated from olefin polymers are widely utilized in the production of textiles, protective coatings for various articles and the like. Olefin polymer films are especially valuable in the packaging and wrapping industries because of their high tensile strength and other physical properties.

In some instances, however, it is desirable to provide such films with improved gloss and reduced haze. Such improvement in the films have been shown to increase the appeal of the wrapped article to customers.

To improve film gloss and to reduce haze it has been a practice in the art to incorporate various additives into the olefin polymer prior to fabrication. Unfortunately in most instances the additives have been somewhat toxic, expensive, or deleterious to the physical properties of the film. In other instances the additives have been employed in relatively large quantities to improve film properties such as slip, blocking and processability in addition to the optical properties.

In view of the need for films and other shaped articles of olefin polymers having improved optical properties, it would be highly desirable to provide an inexpensive, non-toxic olefin polymer composition capable of being fabricated into an article having improved optical properties in addition to the desired strength, flexibility and the like.

SUMMARY OF THE INVENTION

In accordance with the present invention, films and other shaped articles of olefin polymers having improved surface gloss and decreased haze are prepared by incorporating into the polymer from about 20 to about 500 p.p.m. of a metal salt of a fatty acid having 7 to 22 carbon atoms and from about 10 to about 2000 p.p.m. of a metal salt of a carboxylic acid containing an aromatic group.

It is set forth in copending application, Ser. No. 754,959, that the incorporation of the metal salt of the fatty acid alone markedly enhances the gloss and reduces the haze of the resulting film. Contrariwise the incorporation of the metal salt of the carboxylic acid containing an aromatic group alone actually decreases the gloss of the resulting film. Thus it is surprising that incorporating both metal salts into an olefin polymer produces a composition, the resluting film of which has gloss and haze properties superior to both of the previously described films.

The olefin polymer compositions prepared in accordance with this invention are useful in producing films or thin sheets employable as food packaging materials, protective coverings for various articles such as metal tools, furniture, appliances and the like. Typically such sheets have thicknesses ranging from about 0.3 to about 20 mils. The compositions are also employed in the fabrication of pipe, bottles, filaments, blown tubing and the like, especially where gloss and haze of the fabricated polymer are important.

DESCRIPTION OF THE PREFERRED EMBODIMENTS

The olefin polymer compositions prepared in accordance with this invention have as essential ingredients: (1) an olefin polymer, (2) a metal salt of a fatty acid and (3) a metal salt of an aromatic carboxylic acid. Operable compositions have incorporated therein from about 20 to about 500 p.p.m. of (2) and from about 10 to about 2000 p.p.m. of (3), with preferred compositions containing from about 50 to about 400 p.p.m. of (2) and from about 25 to about 1000 p.p.m. of (3). Concentrations of from 100 to 350 p.p.m. of (2) and from 100 to 500 p.p.m. of (3) are especially preferred.

Olefin polymers used in this invention include primarily ethylene polymers, for example, polyethylene, blends of polyethylene, copolymers of ethylene and aliphatic ethylenically unsaturated carboxylic esters, ethylene terpolymers comprised of ethylene, an ethylenically unsaturated carboxylic ester and an ethylenically unsaturated hydrocarbon, and mixtures thereof. Illustrative of the aliphatic, ethylenically unsaturated carboxylic esters which may be copolymerized with ethylene are the acrylic and methacrylic esters and the vinyl esters of monobasic alkanoic acids. Specific examples of such esters are methyl acrylate, ethyl acrylate, n-propyl acrylate, isopropyl acrylate, n-butyl acrylate, isobutyl acrylate, n-hexyl acrylate, cyclohexyl acrylate, 2-ethyl-hexyl acrylate, methyl methacrylate, ethyl methacrylate, n-propyl methacrylate, vinyl propionate, vinyl n-butyrate, vinyl isobutyrate and the like. Ethylene polymers having density within the range of about 0.914 to about 0.950 and melt index in the range of about 0.01 to about 20.0 are preferred.

Examples of the unsaturated hydrocarbons which may be used to form the ethylene terpolymers include propylene, butene-1, pentene-1 and the like. Especially useful terpolymers are terpolymers containing about 0.5 percent to about 20 percent by weight of an ethylenically unsaturated monocarboxylic acid ester such as vinyl acetate, up to about 2 percent of another copolymerizable ethylenically unsaturated hydrocarbon, especially propylene, the balance of the terpolymer composition, i.e. from about 80 percent to about 99 percent by weight, of ethylene, all percentages being based on the total copolymer weight. These terpolymers are described in patent U.S. 3,326,840 issued to H. E. Ross and W. H. Wharton.

While this invention is most advantageous in providing improved articles of ethylene polymers, it may also be employed with advantage in improving the gloss surfaces and haze properties of articles made from other hydrocarbon polymers, particularly α-olefin polymers and copolymers of α-olefins with other α-olefins and aliphatic, ethylenically unsaturated carboxylic esters as described hereinbefore.

Metal salts of fatty acids which are suitable for the purposes of this invention include metal salts of fatty acids having from 7 to 22 carbon atoms, preferably from 16 to 20 carbon atoms. Typical fatty acids are monocarboxylic aliphatic saturated or unsaturated acids having chain lengths of 7 to 22 carbon atoms.

Exemplary of the fatty acid metal salts which can be used in the polymers of this invention are the zinc, calcium, copper, or cadmium salts of heptylic, caprylic, capric, pelargonic, lauric, myristic, palmitic, stearic, arachidic, and behenic as well as their unsaturated analogs such as oleic, ricinoleic, etc. Also included are the metal salts of lauroleic, myristoleic, pentadecanoic, palmitoleic, margaric, linoleic, linolenic, ricinoleic, 12-hydroxystearic and the like. Of the foregoing zinc stearate is the preferred additive. Commercially available zinc stearate having normally occurring impurities is sufficient for the purposes of this invention.

Suitable metal salts of aromatic carboxylic acids are benzoic acid type compounds including metal salts of benzoic acid and substituted benzoic acids. Illustratively the metals of such salts include zinc, calcium, copper, cadmium, nickel, magnesium, manganese, aluminum, cobalt, sodium, potassium, barium, lead, iron and the like. Representative of benzoic acid anions of such salts include benzoate, salicylate, p-aminobenzoate, o-chlorobenzoate, p-toluate, p-tert-butylbenzoate, mandelate, nicotinate, phthalate, terephthalate, biphthalate, p-iodobenzoate, p-bromobenzoate, p-hydroxybenzoate, p-ethoxybenzoate, o-hydroxybenzoate, m-bromobenzoate, p-methoxybenzoate and the like. Of the above metal salts of aromatic carboxylic acids, sodium benzoate is preferred.

While the compositions of the present invention consist substantially of olefin polymers and the above described metal salts, small amounts of conventional additives and modifiers known to be useful in the plastic compounding art such as slip agents, anti-block agents, antioxidnats, stabilizers, antistatic agents, pigments, waxes and the like, can be blended herein.

It is believed that the beneficial results obtained by this invention are attributed to (1) the discovery of a concentration range of the metal salts of fatty acids which appears to have a surprising effect on the nucleation sites of the polymer crystallites as the polymer is cooled from a molten state to a solid state and (2) the discovery that the presence of a metal salt of an aromatic carboxylic acid in combination with the specified amount of metal salt of fatty acid appears to enhance this effect on the nucleation sites. It is further believed that the improvement in gloss shown herein is not due to the presence of the metal salts on the surface of the film. This hypothesis is in sharp contrast to the known use of these materials in larger amounts to achieve decreased blocking and increased slip. It is further believed that the use of the larger amounts (i.e., about 1000 p.p.m. or greater) of the metal salts, especially the metal salts of fatty acids results in exudation of the metal salts to the surface of the film which accounts for the inreased slip and decreased blocking and also impairs the printability.

The olefin polymers of this invention are prepared by melting the polymers and adding specified amounts of the metal salts in a conventional mixer such as a Banbury mixer. Altenratively, the metal salts can be dry blended with a particulate polymer and then extruded. The preferred method is to make a concentrated mixture of the polymer and the salts and then dilute this master-batch down to the desired concentrations by adding additional polymer to it.

Films are formed from the present compositions by conventional equipment in which thin sheets of the polymer are extruded from a die onto chilled rollers and the film is collected on a take-up roll.

The following examples are presented solely to illustrate this invention. No limitation on the scope of the invention is intended nor implied. All parts and percentages are by weight unless otherwise specified.

EXAMPLE 1

Two samples of polyethylene having a melt index of 1.0 decig./min. [ASTM D-1238-65T(E)] and a density of 0.928 were blended respectively with a portion of an additive consisting of zinc stearate and aluminum benzoate and a portion of an additive consisting of zinc stearate and sodium benzoate by passing each sample through an extruder at 175° C. and then re-extruding each sample.

A control sample ($C_1$) of the polyethylene containing no additive was reextruded also to assure that it had the same heat-aging history as the above samples.

Three comparative samples ($B_x$) of the polyethylene containing respectively an additive consisting of aluminum benzoate, an additive consisting of sodium benzoate, and an additive consisting of zinc stearate were prepared according to procedure described above.

The samples were then extruded into a 1.25 mil film (nominal thickness) onto a chilled roll at a rate of 225 feet per minute and the film collected on a take-up roll.

The clarity of these films was measured and found to be substantially unaffected.

The haze, in percent of the film, was measured by ASTM D-1003-61 and reported below.

The gloss, in percent, was measured by ASTM D-2457-65T and the films were all conditioned in accordance witth ASTM D-618. A reading of 100+ indicates that the sample was glossier than the standard to which it was compared in the test.

The results for each sample are shown in Table I for the purposes of comparison.

TABLE I

| Sample No. | Amount of additive, p.p.m. | | | Gardner gloss,[1] Percent | | Haze,[2] percent |
| --- | --- | --- | --- | --- | --- | --- |
| | Zinc stearate | Sodium benzoate | Aluminum benzoate | 20° head | 45° head | |
| 1 | 500 | 1,000 | 0 | 100+ | 90 | 3.4 |
| 2 | 500 | 0 | 1,000 | 91 | 86 | 4.0 |
| $C_1$* | 0 | 0 | 0 | 85 | 84 | 4.0 |
| $B_1$* | 0 | 1,000 | 0 | 79 | 83 | 4.2 |
| $B_2$* | 0 | 0 | 1,000 | 79 | 82 | 5.0 |
| $B_3$* | 500 | 0 | 0 | 100+ | 79 | 3.2 |

[1] As determined by ASTM D-2457 after conditioning films according to ASTM D-618.
[2] As determined by ASTM D-1003-61.
*Not an example of the invention.

Table I shows that the use of zinc stearate in combination with sodium benzoate or aluminum benzoate substantially improves the gloss of the film, even more than the use of zinc stearate alone. Contrariwise, the use of sodium or aluminum benzoate alone decidedly lowers the gloss of the film.

EXAMPLE 2

Following the procedure of Example 1, various amounts of zinc stearate and sodium benzoate were blended with samples of polyethylene having a melt index of 2.0 decig./min. [ASTM D-1238-65T(E)] and a density of 0.920 and containing 800 p.p.m. of erucylamide. A control sample ($C_2$) of the polyethylene containing no zinc stearate or sodium benzoate was reextruded also to assure that it had the same heat-aging history as the above samples.

The samples were extruded through an annular die and blown into a bubble having nominal wall thickness of 1.5 mil. The bubble was cooled collapsed and cut into film of desired dimension.

Gloss and haze of the films were determined and recorded in Table II.

TABLE II

| Sample No. | Amount of additive, p.p.m. | | Gardner gloss,[1] percent | | Haze,[2] percent |
|---|---|---|---|---|---|
| | Zinc stearate | Sodium benzoate | 20° head | 45° head | |
| 3 | 500 | 1,000 | 94 | 79 | 4.3 |
| 4 | 500 | 2,000 | 90 | 78 | 4.7 |
| $C_2$* | 0 | 0 | 83 | 74 | 5.7 |

See footnotes at end of Table I.

Table II shows that increased amounts of sodium benzoate do not contribute any substantial increase in gloss or decrease in haze.

EXAMPLE 3

Following the procedure of Example 1, an additive consisting of zinc stearate and sodium benzoate was blended with a sample of ethylene/vinyl acetate copolymer (97.5/2.5) having a melt flow viscosity of 2.5 decig./min. [ASTM D-1238-65T(D)] and a density of 0.924 and containing 1000 p.p.m. of erucylamide and 1500 p.p.m. of silica flour.

A control sample ($C_3$) of the ethylene/vinyl acetate copolymer containing no zinc stearate or sodium benzoate was reextruded to assure that it had the same heat-aging history.

A comparative sample ($B_4$) was prepared by blending zinc stearate with the copolymer according to the above procedure.

The samples were then blown into 1.5 mil film tube (nominal thickness) at a rate of 25 feet per minute and the film collected on a take-up roll.

The resulting films were tested for gloss and haze and the results are recorded in Table III.

TABLE III

| Sample No. | Amount of additive, p.p.m. | | Gardner gloss,[1] percent | | Haze,[2] percent |
|---|---|---|---|---|---|
| | Zinc stearate | Sodium benzoate | 20° head | 45° head | |
| 5 | 500 | 100 | 80 | 72 | 4.9 |
| $C_3$* | 0 | 0 | 72 | 70 | 5.0 |
| $B_4$* | 500 | 0 | 74 | 73 | 5.3 |

See footnotes at end of Table I.

As evidenced in Table III, the film containing both zinc stearate and sodium benzoate exhibits higher gloss and lower haze than either the control sample or the comparative sample containing only zinc stearate.

EXAMPLE 4

A polyethylene homopolymer having a density of 0.930 and a melt index of 2.8 was used for this experiment. A portion of the polymer was tested without additives specified in Table IV as $C_4$. A large portion of the polymer was blended with 800 p.p.m. erucylamide, 1600 p.p.m. silica flour, and 150 p.p.m. Ionol; this blend is specified in Table IV as $C_5$. The blend ($C_5$) was used as a masterbatch from which portions were taken and further blended with aluminum benzoate, sodium benzoate and zinc stearate as shown in Table IV.

Each sample tested was given the same number of passes through the extruder in order that the heat-age history of each sample would be about the same. Samples were cast into films in similar manner to Example 1 and the results are recorded in Table IV.

TABLE IV

| Sample No. | Additives (p.p.m.) | Gardner gloss,[1] percent | | Gardner haze,[3] percent |
|---|---|---|---|---|
| | | 20° head | 45° head | |
| $C_4$* | | 77 | 81 | 2.9 |
| $C_5$* | | 93 | 83 | 2.9 |
| $B_5$* | 1,000 aluminum benzoate | 93 | 82 | 3.5 |
| $B_6$* | 1,000 sodium benzoate | 95 | 83 | 3.4 |
| 6 | 1,000 aluminum benzoate, 500 zinc stearate | 114 | 87 | 2.8 |
| 7 | 1,000 sodium benzoate, 500 zinc stearate | 114 | 87 | 2.7 |
| 8 | 50 sodium benzoate, 50.0 zinc stearate | 113 | 88 | 2.7 |

See footnotes at end of Table I.

EXAMPLE 5

A polyethylene homopolymer having a density of 0.926 and a melt index of 1.0 and containing 800 p.p.m. of erucylamide, 1600 p.p.m. silica flour, and 150 p.p.m. Ionol was used for this experiment. A portion of the polymer was tested without the stearate and benzoate additives and is specified as $C_6$ in Table V. The samples marked as "dry blend" indicates that the stearate and/or benzoate additives were dry-blended with the particulate polymer, then extruded into cast film, whereas the other samples were melt-blended in an extruder and the re-extruded into cast film.

Each sample tested was given the same number of passes through the extruder in order that the heat-age history of each sample would be about the same. Samples were cast into film in similar manner to Example 1 and tested for optical properties. The results are recorded in Table V.

TABLE V

| Sample No. | Additives (p.p.m.) | Gardner gloss,[1] percent | | Gardner haze,[2] percent |
|---|---|---|---|---|
| | | 20° head | 45° head | |
| $C_6$* | None | 76 | 80 | 4.9 |
| 9 | 500 Zn stearate, 10 Na benzoate | 104 | 86 | 3.1 |
| 10 | 500 Zn stearate, 25 Na benzoate | 104 | 88 | 3.1 |
| 11 | 500 Zn stearate, 50 Na benzoate | 106 | 88 | 2.8 |
| $B_6$* | 500 Zn stearate, dry blend | 96 | 86 | 3.5 |
| 12 | 500 Zn stearate, 100 Na benzoate, dry blend | 102 | 87 | 3.1 |

See footnotes at end of Table I.

What is claimed is:

1. An ethylene polymer composition capable of being fabricated into articles having improved surface gloss and decreased haze comprising a normally solid ethylene polymer having incorporated therein (1) from about 20 to about 500 p.p.m. of a metal salt of a fatty acid having from 7 to 22 carbon atoms and (2) from about 10 to about 2000 p.p.m. of a metal salt of an aromatic carboxylic acid.

2. The ethylene polymer composition according to claim 1 wherein the metal salt of carboxylic acid containing an aromatic group is a metal benzoate.

3. The ethylene polymer composition according to claim 2 wherein the metal benzoate is sodium benzoate.

4. The ethylene polymer composition according to claim 2 wherein the metal benzoate is aluminum benzoate.

5. The ethylene polymer composition according to claim 1 wherein the metal salt of fatty acid is a metal stearate.

6. The ethylene polymer composition according to claim 5 wherein the metal stearate is zinc stearate.

7. The ethylene polymer composition according to claim 1 wherein the olefin polymer is polyethylene.

8. The ethylene polymer composition according to claim 1 wherein the ethylene polymer has incorporated therein from about 50 to about 400 p.p.m. of the metal salt of fatty acid and from about 25 to about 1000 p.p.m. of the metal salt of an aromatic carboxylic acid.

9. A sheet of ethylene polymer comprising the composition of claim 1, said sheet having a thickness ranging from about 0.3 to about 20 mils.

10. A method for improving surface gloss and decreasing haze of fabricated articles of ethylene polymers which comprises (a) incorporating (1) from about 20 to about 500 p.p.m. of a metal salt of a fatty acid having from 7 to 22 carbon atoms and (2) from about 10 to about 2000 p.p.m. of a metal salt of an aromatic carboxylic acid into an ethylene polymer and (b) fabricating the resulting polymer.

11. An olefin polymer composition capable of being fabricated into articles having improved surface gloss and decreased haze comprising a normally solid ethylene polymer having incorporated therein (1) from about 20 to about 500 p.p.m. of a metal salt of a fatty acid selected from the group consisting of the zinc, calcium, copper, and cadmium salts of heptylic, caprylic, capric, pelargonic, lauric, myristic, palmitic, stearic, arachidic, behenic, oleic, ricinoleic, myristoleic, pentadecanoic, palmitoleic, margaric, linoleic, linolenic, and 12-hydroxystearic acids and (2) from about 10 to about 2000 p.p.m. of a metal salt of an aromatic carboxylic acid selected from the group consisting of the zinc, calcium, copper, cadmium, nickel, magnesium, manganese, aluminum, cobalt, sodium, potassium, barium, lead, iron salts of benzoic, salicylic, p-aminobenzoic, o-chlorobenzoic, p-toluic, p-tert-butylbenzoic, mandelic, nicotinic, phthalic, terephthalic, biphthalic, p-iodobenzoic, p-ethoxybenzoic, o-hydroxybenzoic, m-bromobenzoic and p-methoxybenzoic acids.

12. The olefin polymer composition according to claim 11 comprising a normally solid polyethylene having incorporated therein (1) from about 50 to about 400 p.p.m. of zinc stearate and (2) from about 25 to about 1000 p.p.m. of a metal salt of an aromatic carboxylic acid selected from the group consisting of sodium benzoate and aluminum benzoate.

References Cited

UNITED STATES PATENTS

| 3,022,194 | 2/1962 | Vollmer | 260—23H |
| 3,118,847 | 1/1964 | Greear | 260—23H |
| 3,367,926 | 2/1968 | Voeks | 260—93.5 |

JOSEPH L. SCHOFER, Primary Examiner

W. F. HAMROCK, Assistant Examiner

U.S. Cl. X.R.

260—80.78, 80.81, 86.7, 94.9, 897